(12) United States Patent
Fan

(10) Patent No.: US 11,784,013 B1
(45) Date of Patent: Oct. 10, 2023

(54) MOUSE DEVICE

(71) Applicant: Primax Electronics Ltd., Taipei (TW)

(72) Inventor: Shun-Biao Fan, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/897,006

(22) Filed: Aug. 26, 2022

(30) Foreign Application Priority Data

Aug. 10, 2022 (CN) .......................... 202210955746.2

(51) Int. Cl.
*G06F 3/038* (2013.01)
*H01H 13/14* (2006.01)
*H01H 13/20* (2006.01)
*G06F 3/02* (2006.01)
*G06F 3/0354* (2013.01)

(52) U.S. Cl.
CPC ........... *H01H 13/14* (2013.01); *G06F 3/0202* (2013.01); *G06F 3/0383* (2013.01); *G06F 3/03543* (2013.01); *H01H 13/20* (2013.01)

(58) Field of Classification Search
CPC ............... G06F 3/03543; G06F 3/0362; G06F 2203/0333; H01H 13/04; H01H 13/85; H01H 2227/032
See application file for complete search history.

(56) References Cited

U.S. PATENT DOCUMENTS

| | | | | |
|---|---|---|---|---|
| 6,072,471 | A * | 6/2000 | Lo ........................ | G06F 3/03543 341/20 |
| 2003/0043117 | A1* | 3/2003 | Lantigua ............. | G06F 3/03543 345/163 |
| 2005/0275621 | A1* | 12/2005 | Saez ................... | G06F 3/03543 345/156 |
| 2009/0213068 | A1* | 8/2009 | Saez ................... | G06F 3/03543 345/156 |
| 2022/0050534 | A1* | 2/2022 | Van Hooft .......... | G06F 3/03543 |
| 2022/0206596 | A1* | 6/2022 | Rutledge ............. | G06F 3/03543 |

* cited by examiner

*Primary Examiner* — Jonathan A Boyd
(74) *Attorney, Agent, or Firm* — KIRTON McCONKIE; Evan R. Witt

(57) ABSTRACT

A mouse device includes a casing and plural key modules. The plural key modules are installed on two opposite sides of the casing. Each key module includes a switch, an elastic element, a keycap and a stopper. The switch and the elastic element are disposed within the casing. The keycap is detachably connected with the elastic element. The elastic element is arranged between the keycap and the switch. When the keycap is in a pressable state and the keycap is pressed in response to an external force, the keycap is moved in a direction toward the switch and the elastic element is moved with the keycap, so that the switch is triggered by the elastic element. The stopper is detachably connected between the keycap and the elastic element. When the keycap is stopped by the stopper, the keycap is switched from the pressable state to a non-pressable state.

10 Claims, 11 Drawing Sheets

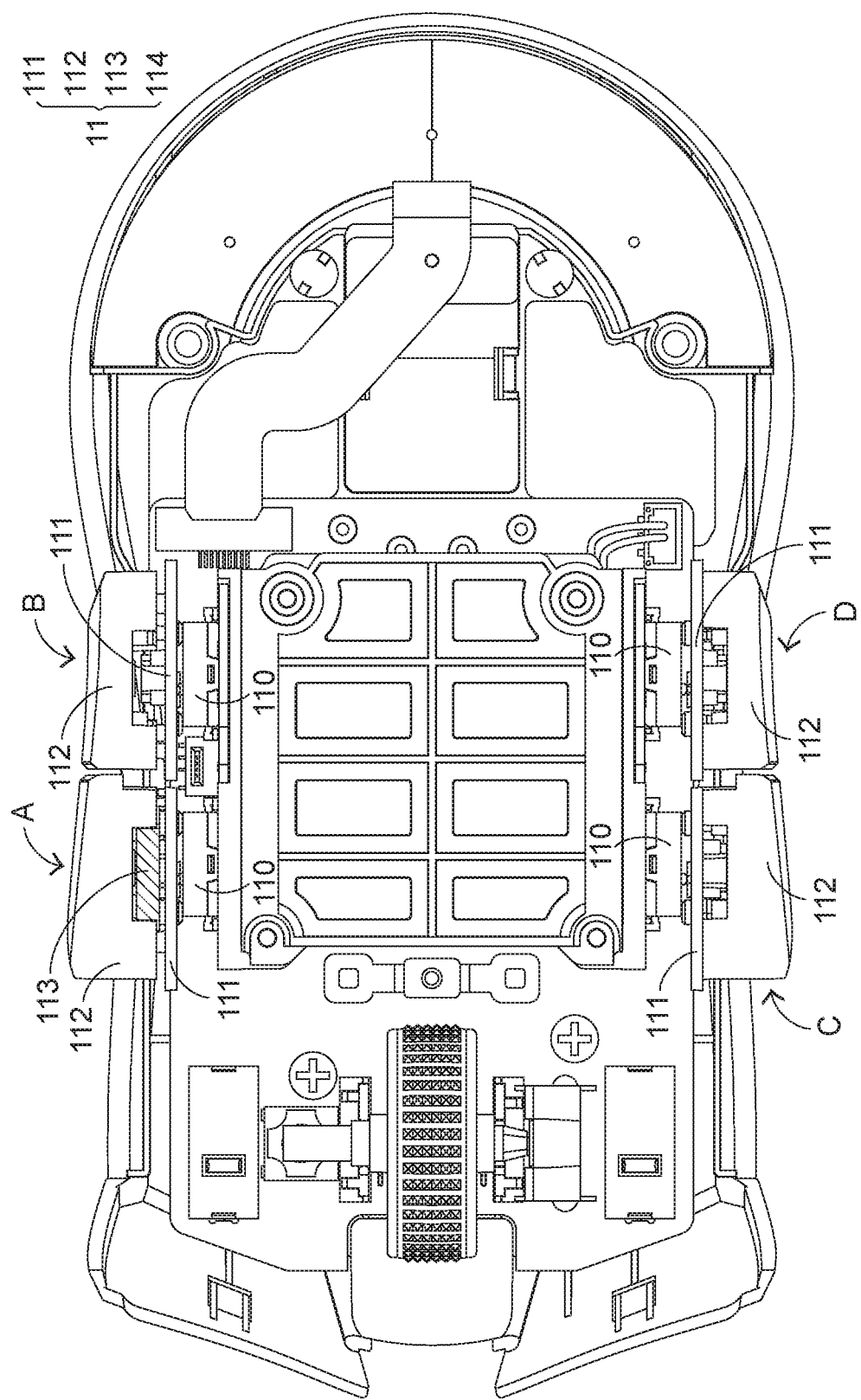

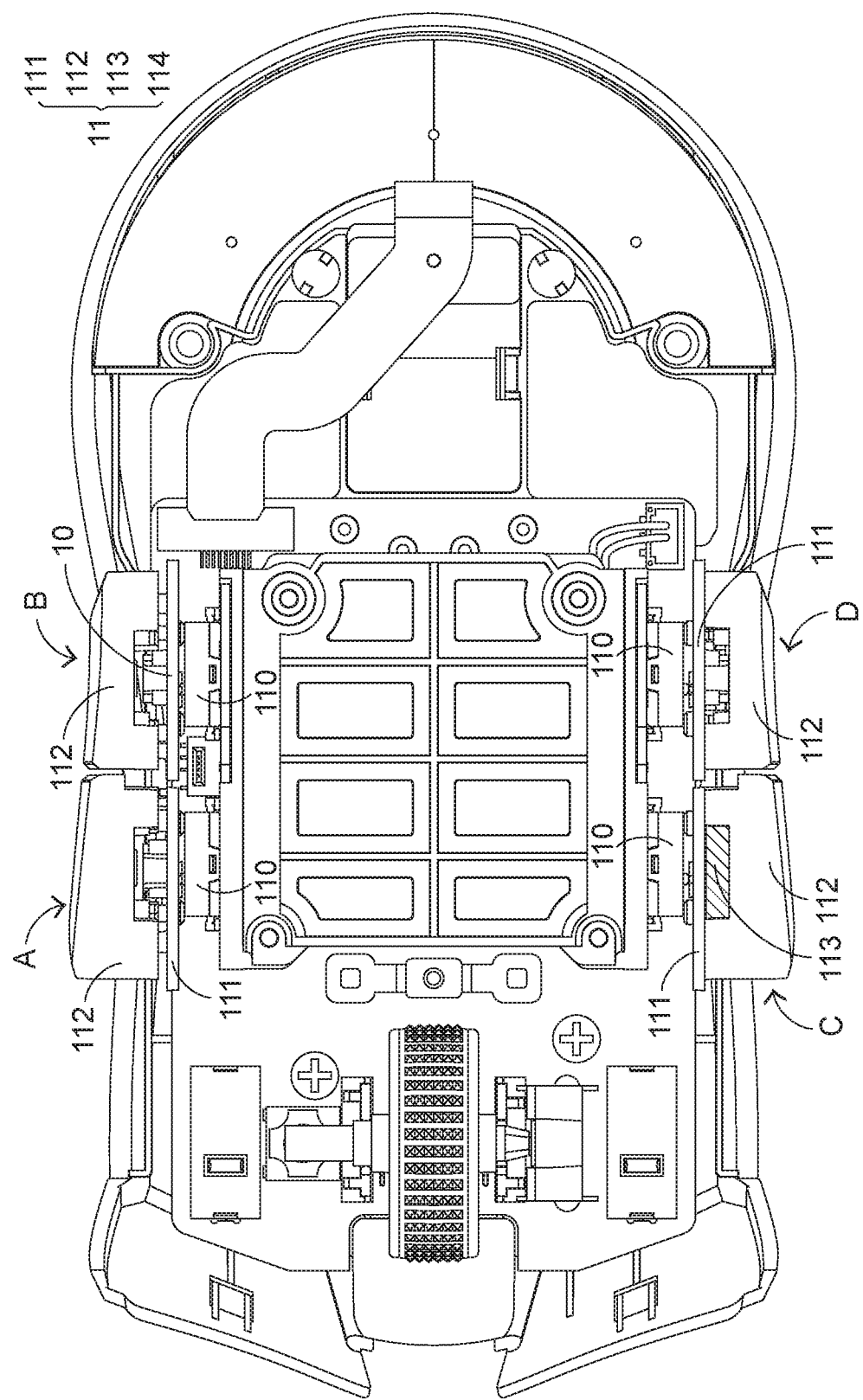

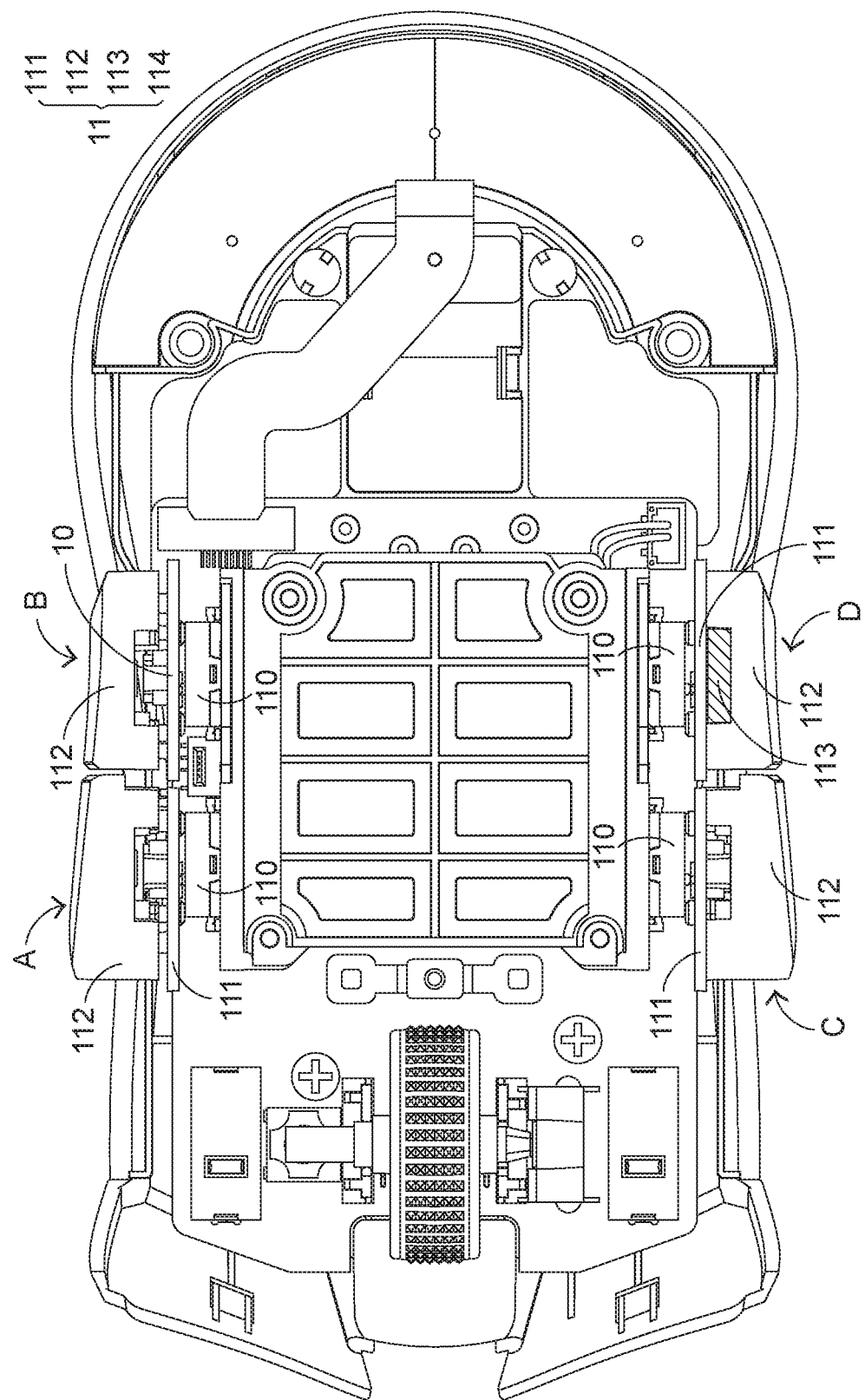

MOUSE DEVICE

FIELD OF THE INVENTION

The present invention relates to an input device, and more particularly to a mouse device.

BACKGROUND OF THE INVENTION

A mouse is used to control a cursor on a computer screen in order to operate the computer. Since 1968, the United States has produced the world's first mouse. After then, the mouse is applied to word processing operations, video games, industrial drawings, drawing design or media production. Consequently, the mouse has become an indispensable part of the computer system. In the early stage, the mouse device uses a trackball to detect the displacement of the mouse. With increasing development of science and technology, an optical module or a laser module is used to detect the displacement of the mouse device in order to enhance the working efficiency. Moreover, for increasing the functionality and convenience of the mouse device, the earliest wired single-key mouse device is gradually evolved into the modern wireless multi-key roller mouse device.

In addition to the left and right keys on the top surface of the casing of the mouse device, the two opposite sides of the casing are further equipped with some additional keys. The functions of the mouse device to be executed by the additional keys on the two opposite sides of the casing of the mouse device can be defined by the user. However, the uses of the additional keys on the two opposite sides of the casing are not friendly to the users. For example, due to the operating habits of different users, the additional keys on the two opposite sides of the casing may be accidentally triggered. For example, if the user is accustomed to operating the keys on the left side of the casing, the keys on the right side of the casing may still be accidentally triggered during use.

Therefore, there is a need of providing an improved mouse device in order to overcome the drawbacks of the conventional technologies.

SUMMARY OF THE INVENTION

An object of the present invention provides a mouse device with plural key modules. The key module of the mouse device can be switched between a pressable state and a non-pressable state.

The other objects and advantages of the present invention will be understood from the disclosed technical features.

In accordance with an aspect of the present invention, a mouse device is provided. The mouse device includes a casing and plural key modules. The plural key modules are installed on two opposite sides of the casing. Each of the plural key modules includes a switch, an elastic element, a keycap and a stopper. The switch is disposed within the casing. The elastic element is disposed within the casing and aligned with the switch. The keycap is detachably connected with the elastic element and exposed outside the casing. The elastic element is arranged between the keycap and the switch. When the keycap is in a pressable state and the keycap is pressed in response to an external force, the keycap is moved in a direction toward the switch and the elastic element is moved with the keycap, so that the switch is triggered by the elastic element. The stopper is detachably connected between the keycap and the elastic element. When the keycap is stopped by the stopper, the keycap is switched from the pressable state to a non-pressable state.

In an embodiment, the stopper includes a first stopping part, and the first stopping part includes a first sleeve and a first contact post. The first sleeve is extended in a direction toward the keycap and connected with the keycap. The first contact post is connected with the first sleeve and extended in a direction toward the switch. The first contact post is penetrated through the elastic element and contacted with the switch.

In an embodiment, the stopper further includes a second stopping part and a connecting part. The connecting part is connected between the first stopping part and the second stopping part. The second stopping part includes a second sleeve and a second contact post. The second sleeve is extended in a direction toward the keycap and connected with the keycap. The second contact post is connected with the second sleeve and extended in a direction toward the switch. The second contact post is penetrated through the elastic element and contacted with the switch.

In an embodiment, the keycap includes a first connecting post and a second connecting post. The first connecting post and the second connecting post are extended in a direction toward the elastic element. The first connecting post is inserted in the first sleeve of the first stopping part. The second connecting post is inserted in the second sleeve of the second stopping part.

In an embodiment, each of the first sleeve and the second sleeve has a contact surface. When the first connecting post is inserted in the first sleeve, the first connecting post is contacted with the contact surface of the first sleeve. When the second connecting post is inserted in the second sleeve, the second connecting post is contacted with the contact surface of the second sleeve.

In an embodiment, the elastic element includes a first opening and a second opening. The first contact post of the stoppering is penetrated through the first opening and contacted with a first side of the switch. The second contact post of the stopper is penetrated through the second opening and contacted with a second side of the switch.

In an embodiment, the elastic element further includes a triggering part and a bracket part. The bracket part is connected between the triggering part and the casing. The first opening and the second opening are respectively located at two opposite sides of the triggering part. When the keycap is in the pressable state and the keycap is pressed in response to the external force, the keycap is moved toward the switch and the triggering part of the elastic element is moved with the keycap, so that the switch is triggered by the triggering part of the elastic element.

In an embodiment, each of the plural key modules further includes a first magnet and a second magnet. The first magnet is installed on the keycap. The second magnet is installed on the elastic element. The keycap and the elastic element are detachably connected with each other in response to a magnetic attraction force between the first magnet and the second magnet.

In an embodiment, after the stopper is removed from a region between the keycap and the elastic element, the keycap is switched from the non-pressable state to the pressable state.

In an embodiment, the mouse device further includes a key plate. The key plate covers a top side of the casing. The key plate is arranged between the plural key modules. When each of the plural key modules is pressed down, the mouse device issues a first key signal. When the key plate is pressed down, the mouse device issues a second key signal. The second key signal is different from the first key signal.

From the above descriptions, the present invention provides the mouse device. In case that the stopper is installed between the keycap and the elastic element, the key module is switched from the pressable state to the non-pressable state. Due to this structural design, some or all of the key modules of the mouse device can be selectively switched to the non-pressable state by the user according to the use habit. During the process of using the mouse device, the user will not accidentally press the unnecessary key module. Consequently, the convenience of using the mouse device is largely enhanced.

The above objects and advantages of the present invention will become more readily apparent to those ordinarily skilled in the art after reviewing the following detailed description and accompanying drawings, in which:

BRIEF DESCRIPTION OF THE DRAWINGS

FIGS. 6A to 6F schematically illustrate the structures of the mouse device as shown in FIG. 1 in different use scenarios.

DETAILED DESCRIPTION OF THE PREFERRED EMBODIMENT

Figure 1:
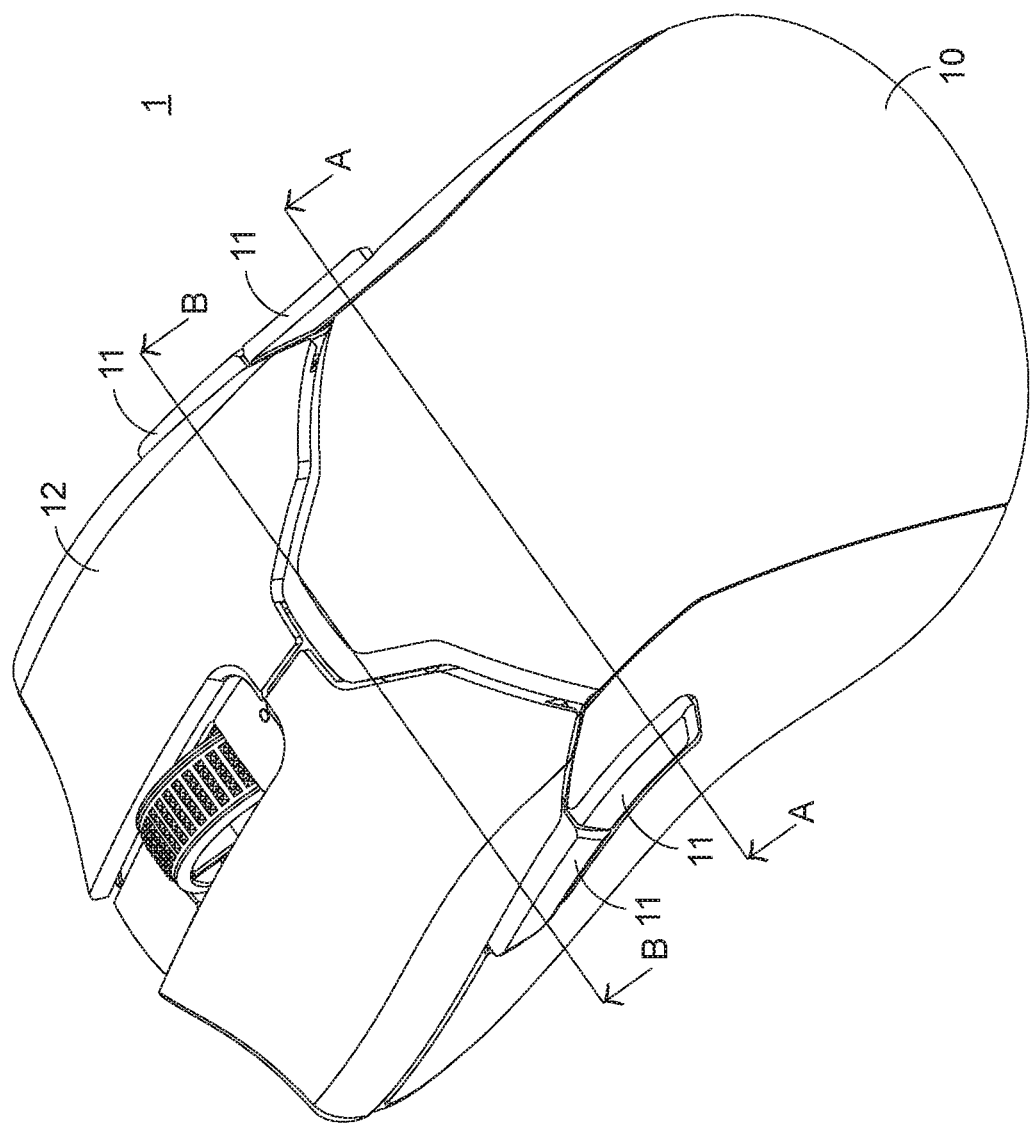
FIG. 1 is a schematic perspective view illustrating the appearance of a mouse device according to an embodiment of the present invention.
Figure 2:
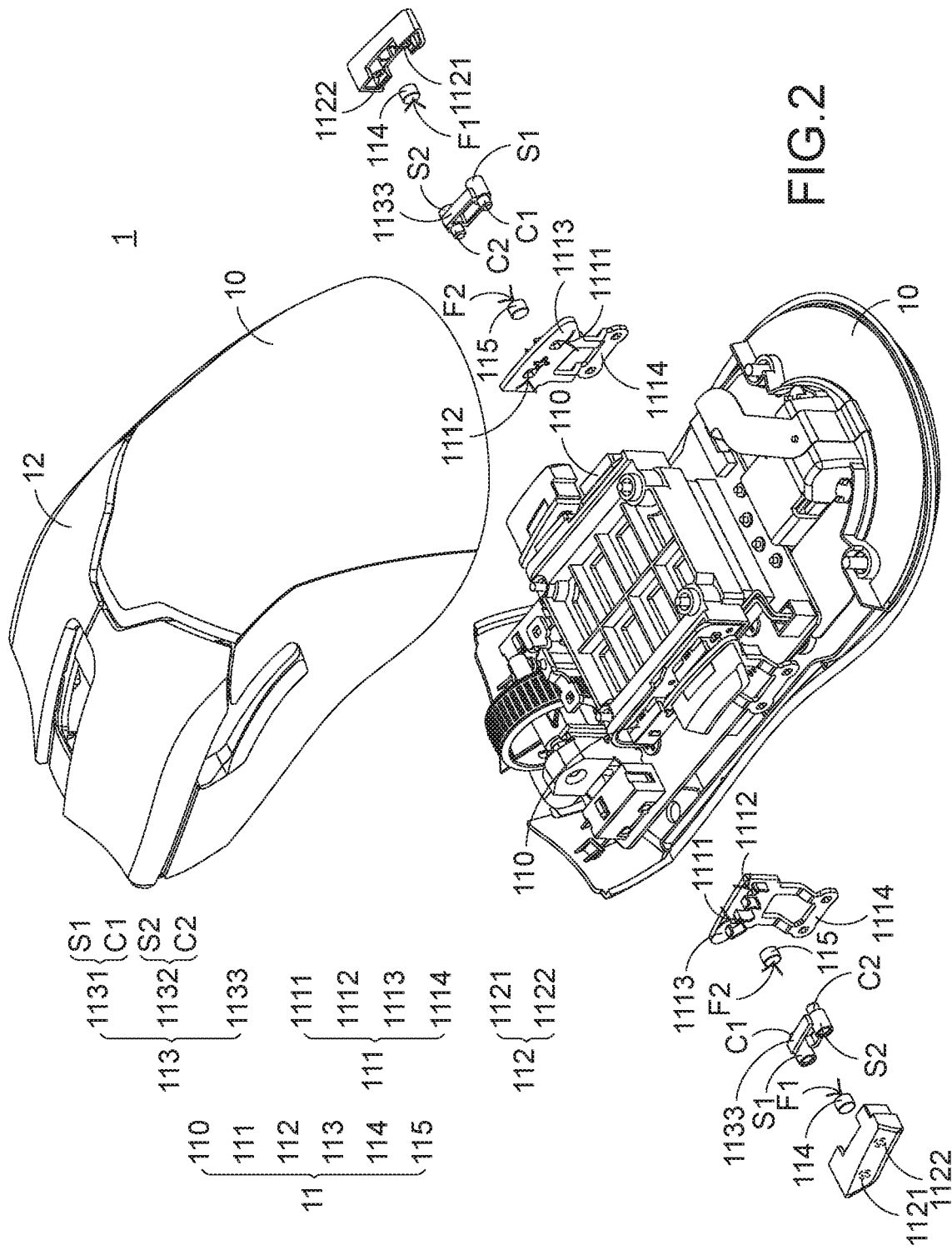
FIG. 2 is a schematic exploded view illustrating components of the mouse device as shown in FIG. 1 and taken along a viewpoint.
Figure 3:
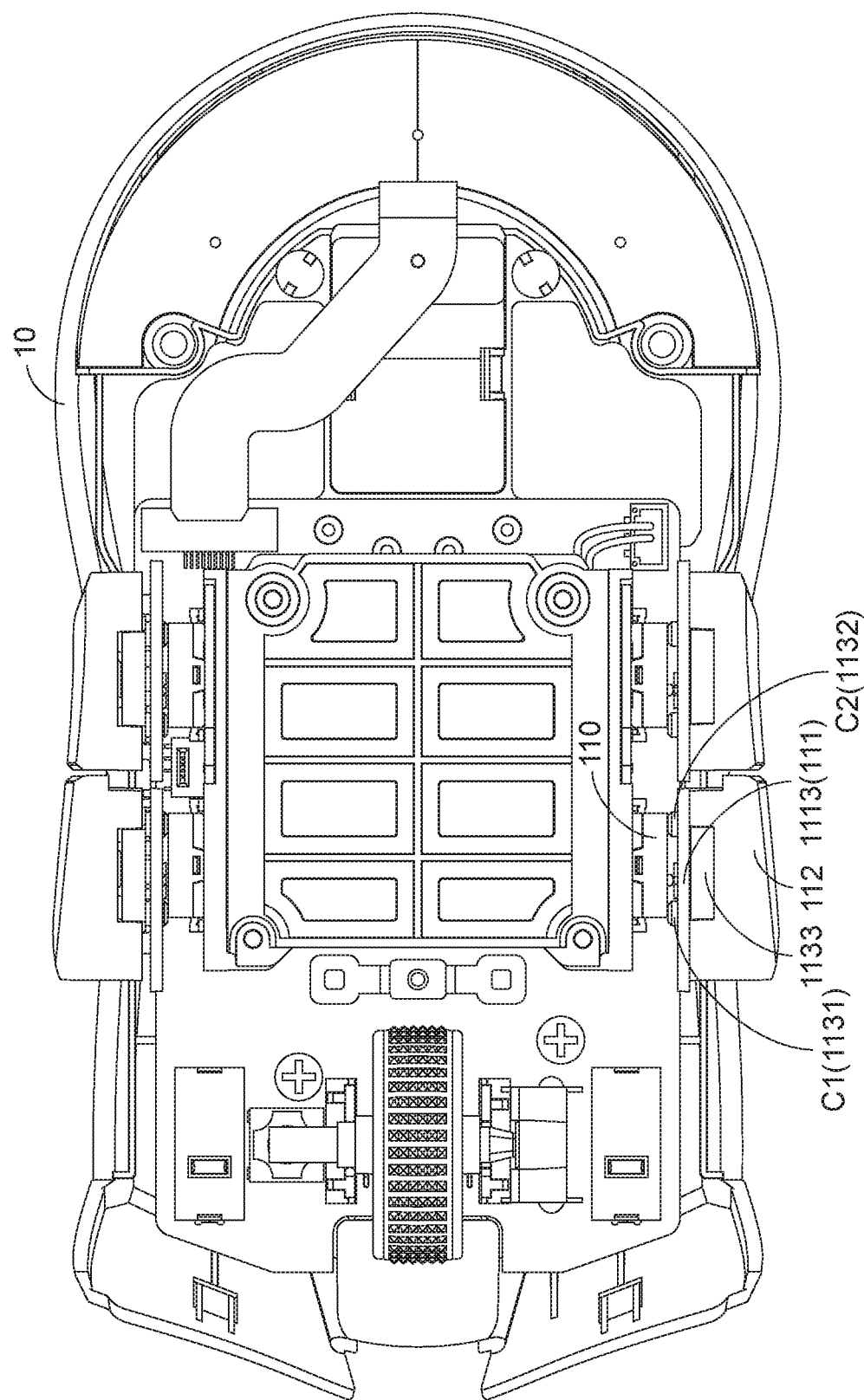
FIG. 3 is a schematic top view illustrating the mouse device as shown in FIG. 1.
Figure 4:
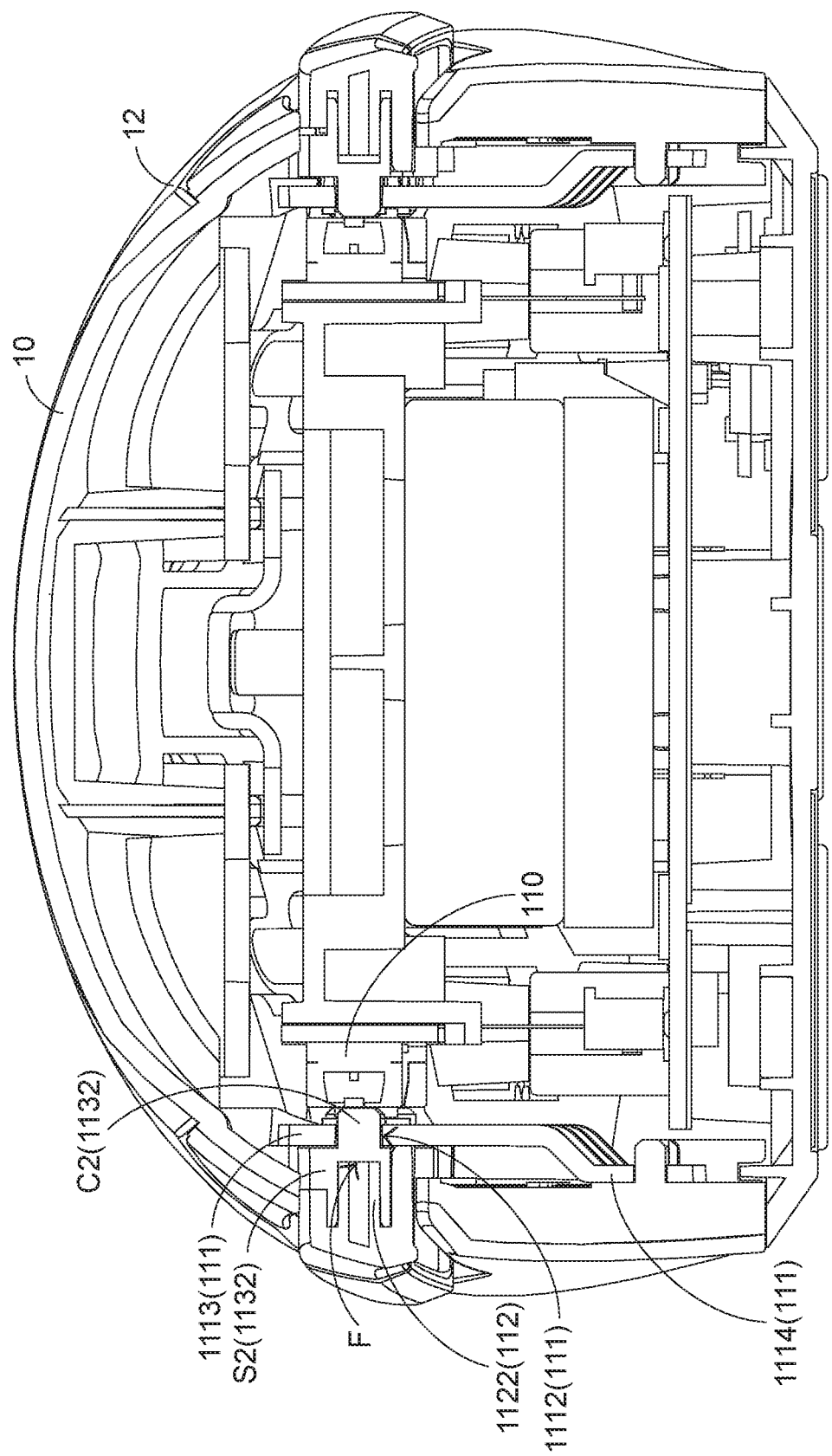
FIG. 4 is a schematic cutaway view illustrating the mouse device as shown in FIG. 1 and taken along a line AA.
Figure 5:
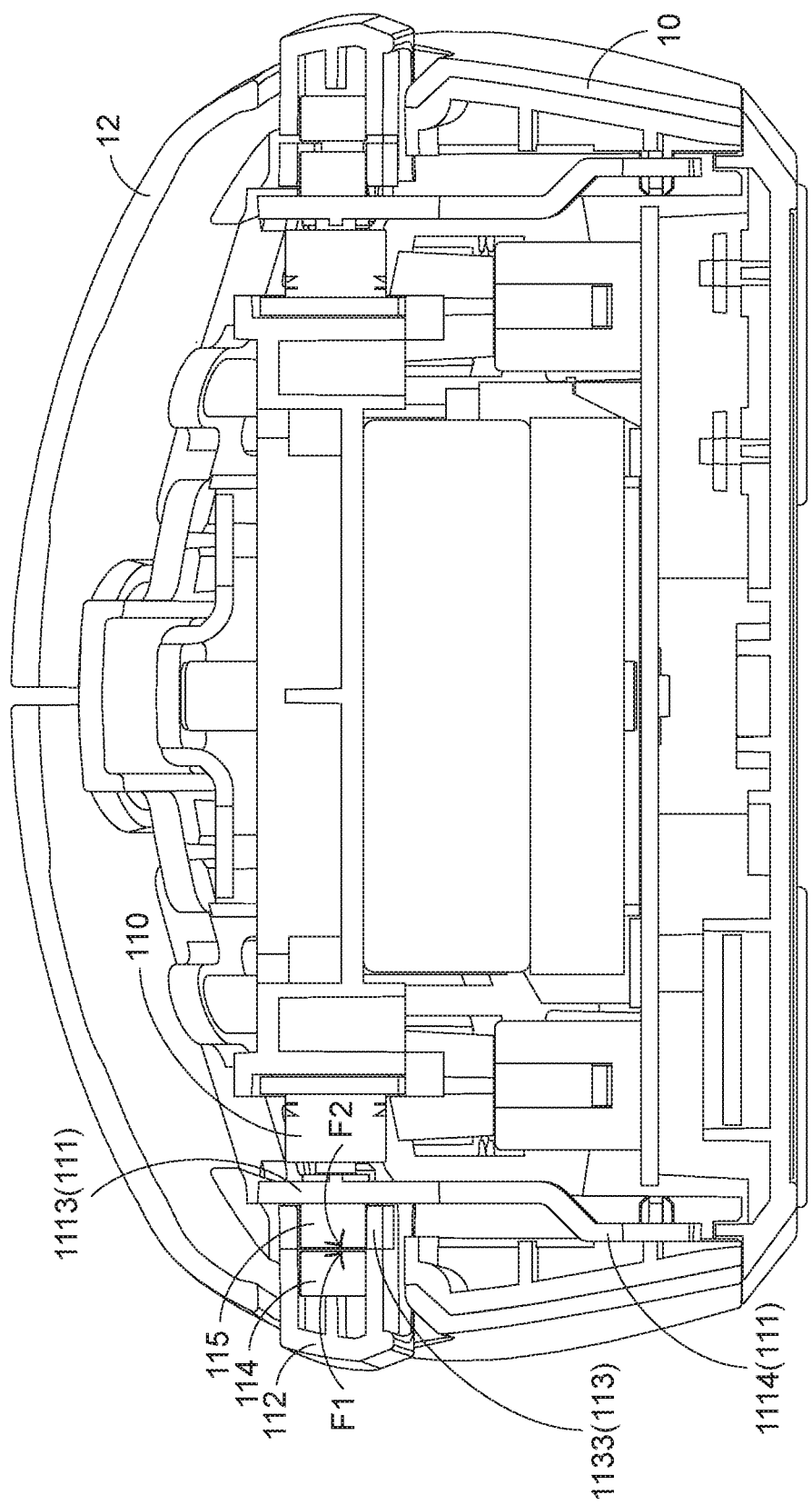
FIG. 5 is a schematic cutaway view illustrating the mouse device as shown in FIG. 1 and taken along a line BB.

FIG. 1 is a schematic perspective view illustrating the appearance of a mouse device according to an embodiment of the present invention. FIG. 2 is a schematic exploded view illustrating components of the mouse device as shown in FIG. 1 and taken along a viewpoint. FIG. 3 is a schematic top view illustrating the mouse device as shown in FIG. 1. FIG. 4 is a schematic cutaway view illustrating the mouse device as shown in FIG. 1 and taken along a line AA. FIG. 5 is a schematic cutaway view illustrating the mouse device as shown in FIG. 1 and taken along a line BB. For clearly describing the structural features of the mouse device, a portion of a casing and a key plate of the mouse device are not shown in FIG. 3.

Please refer to FIGS. 1, 2, 3, 4 and 5. In an embodiment, the mouse device 1 comprises a casing 10 and plural key modules 11. These key modules 11 are installed on two opposite sides of the casing 10. Each key module 11 comprises a switch 110, an elastic element 111, a keycap 112 and a stopper 113. The switch 110 is disposed within the casing 10. The elastic element 111 is disposed within the casing 10. Moreover, the elastic element 111 is aligned with the switch 110. The elastic element 111 is arranged between the keycap 112 and the switch 110. The keycap 112 is detachably connected with the elastic element 111. Moreover, the keycap 112 is exposed outside the casing 10. The keycap 112 can be pressed down by user. The stopper 113 is detachably connected between the keycap 112 and the elastic element 11.

In case that the stopper 113 is installed between the keycap 112 and the elastic element 111, the keycap 112 is stopped by the stopper 113. Under this circumstance, the keycap 112 is in a non-pressable state. Whereas, in case that the stopper 113 is removed from the region between the keycap 112 and the elastic element 111, the keycap 112 is switched from the non-pressable state to the pressable state. When the keycap 112 is in the pressable state and the keycap 112 is pressed in response to an external force, the keycap 112 is moved in a direction toward the switch 110. While the keycap 112 is moved toward the switch 110, the elastic element 111 is correspondingly moved toward the switch 110. Consequently, the switch 110 is triggered by the elastic element 111. When the external force applied to the keycap 112 is released, the keycap 112 is moved in a direction away from the switch 110 in response to an elastic restoring force of the elastic element 111. Consequently, the keycap 112 is moved in the direction away from the switch 110 and returned to its original position.

The other structures of the mouse device 1 will be described in more details as follows.

Please refer to FIGS. 2, 3, 4 and 5 again. In an embodiment, the stopper 113 comprises a first stopping part 1131, a second stopping part 1132 and a connecting part 1133. The connecting part 1133 is connected between the first stopping part 1131 and the second stopping part 1132. The first stopping part 1131 comprises a first sleeve S1 and a first contact post C1. The first sleeve S1 is extended in a direction toward the keycap 112 and connected with the keycap 112. The first contact post C1 is connected with the first sleeve S1 and extended in a direction toward the switch 110. Moreover, the first contact post C1 is penetrated through the elastic element 111 and contacted with the switch 110.

The second stopping part 1132 comprises a second sleeve S2 and the second contact post C2. The second sleeve S2 is extended in a direction toward the keycap 112 and connected with the keycap 112. The second contact post C2 is connected with the second sleeve S2 and extended in a direction toward the switch 110. Moreover, the second contact post C2 is penetrated through the elastic element 111 and contacted with the switch 110.

Please refer to FIGS. 2, 3, 4 and 5 again. In an embodiment, the keycap 112 comprises a first connecting post 1121 and a second connecting post 1122. The first connecting post 1121 and the second connecting post 1122 are located at two opposite sides of the keycap 112, respectively. The first connecting post 1121 and the second connecting post 1122 are extended in a direction toward the elastic element 111. In case that the stopper 113 is installed between the keycap 112 and the elastic element 111, the first connecting post 1121 of the keycap 112 is inserted in the first sleeve S1 of the stopper 113, and the second connecting post 1121 is inserted in the second sleeve S2 of the stopper 113.

Moreover, each of the first sleeve S1 and the second sleeve S2 of the stopper 113 has a contact surface F. When the first connecting post 1121 of the keycap 112 is inserted in the first sleeve S1, the first connecting post 1121 is contacted with the contact surface F of the first sleeve S1. When the second connecting post 1121 of the keycap 112 is inserted in the second sleeve S2, the second connecting post 1121 is contacted with the contact surface F of the second sleeve S2.

Please refer to FIGS. 2, 3, 4 and 5 again. In an embodiment, the elastic element 111 comprises a first opening 1111 and a second opening 1112. The first opening 1111 and the second opening 1112 are located at two opposite sides of the elastic element 111, respectively. In case that the stopper 113 is installed between the keycap 112 and the elastic element 111, the first contact post C1 of the stoppering 113 is penetrated through the first opening 1111 of the elastic element 111 and contacted with a first side of the switch 110. Moreover, the second contact post C2 of the stopper 113 is penetrated through the second opening 1112 of the elastic element 111 and contacted with a second side of the switch 110.

Please refer to FIGS. 2, 3, 4 and 5 again. In an embodiment, the elastic element 111 further comprises a triggering part 1113 and a bracket part 1114. The bracket part 1114 is connected between the triggering part 1113 and the casing 10. That is, the elastic element 111 is connected with the casing 10 through the bracket part 1114. The first opening 1111 and the second opening 1112 of the elastic element 111 are located at two opposite sides of the triggering part 1113, respectively. When the keycap 112 is in the pressable state and the keycap 112 is moved toward the switch 110 in response to the external force, the keycap 112 is moved in a direction toward the switch 110. While the keycap 112 is moved toward the switch 110, the triggering part 1113 of the elastic element 111 is correspondingly moved toward the switch 110. Consequently, the switch 110 is triggered by the triggering part 1113 of the elastic element 111. When the external force applied to the keycap 112 is released, the keycap 112 is moved in a direction away from the switch 110 in response to an elastic restoring force of the bracket part 1114 of the elastic element 111. Consequently, the keycap 112 is moved in the direction away from the switch 110 and returned to its original position.

Please refer to FIGS. 2, 3, 4 and 5 again. In an embodiment, each key module 11 further comprises a first magnet 114 and a second magnet 115. The first magnet 114 is installed on the keycap 112. Moreover, the first magnet 114 is arranged between the first connecting post 1121 and the second connecting post 1122 of the keycap 112. The second magnet 115 is installed on the triggering part 113 of the elastic element 111 and arranged between the first opening 1111 and the second opening 1112 of the elastic element 111. Moreover, the first magnet 114 has a first pole surface F1 facing the second magnet 115, and the second magnet 115 has a second pole surface F2 facing the first magnet 114. The first pole surface F1 and the second pole surface F2 have unlike poles. Since the first pole surface F1 of the first magnet 114 and the second pole surface F2 of the second magnet 115 have the unlike poles, a magnetic attraction force between the first magnet 114 and the second magnet 115 is generated. In response to the magnetic attraction force, the keycap 112 and the elastic element 111 are detachably connected with each other.

A process of switching the key module 11 (or the keycap 112) from the non-pressable state to the pressable state will be described as follows. Firstly, the keycap 112 is removed by the user, and thus the keycap 112 is detached from the stopper 113. That is, the first connecting post 1121 and the second connecting post 1122 of the keycap 112 are removed from the first sleeve S1 and the second sleeve S2 of the stopper 113, respectively. Then, the stopper 113 is removed and detached from the elastic element 111. That is, the first contact post C1 and the second contact post C2 of the stopper 113 are removed from the first opening 1111 and the second opening 1112 of the elastic element 111, respectively. Afterwards, the keycap 112 is installed on the elastic element 111. That is, the keycap 112 is attached on the elastic element 111 through the magnetic attraction between the first magnet 114 on and the second magnet 115.

A process of switching the key module 11 (or the keycap 112) from the pressable state to the non-pressable state will be described as follows. Firstly, the keycap 112 is removed by the user, and thus the keycap 112 is detached from the elastic element 111. That is, the first magnet 114 on the keycap 112 and the second magnet 115 on the elastic element 111 are not magnetically attracted by each other. Then, the stopper 113 is installed on the elastic element 111. That is, the first contact post C1 and the second contact post C2 of the stopper 113 are penetrated through the first opening 1111 and the second opening 1112 of the elastic element 111, respectively. Afterwards, the keycap 112 is installed on the stopper 113. That is, the first connecting post 1121 and the second connecting post 1122 of the keycap 112 are inserted in the first sleeve S1 and the second sleeve S2 of the stopper 113, respectively.

In the above embodiment, the stopper 113 comprises two stopping parts (a first stopping part 1131 and a second stopping part 1132), and the connecting part 1133 is connected between the first stopping part 1131 and the second stopping part 1132. It is noted that the number of the stopping parts of the is not restricted. For example, in case the stopper 113 is able to effectively stop that the keycap 112 from being moved in the direction toward the switch 110, the stopper 113 with a single stopping part is feasible.

Please refer to FIGS. 1, 2, 4 and 5 again. In an embodiment, the mouse device 1 further comprises a key plate 12. The key plate 12 covers a top side of the casing 10. Moreover, the key plate 12 is arranged between the plural key modules 11. When each of the plural key modules 11 is pressed down, the mouse device 1 outputs a first key signal to a computing device that is connected with the mouse device 1. According to the first key signal, the computing device executes the corresponding command or function. When the key plate 12 is pressed down, the mouse device 1 outputs a second key signal to the computing device that is connected with the mouse device 1. The second key signal is different from the first key signal. According to the second key signal, the computing device executes the corresponding command or function.

FIGS. 6A to 6F schematically illustrate the structures of the mouse device as shown in FIG. 1 in different use scenarios. The structures of the mouse device 1 in different use scenarios will be illustrated with reference to FIGS. 6A to 6F and FIGS. 1 to 5.

Please refer to FIG. 6A. The key module 11 at the position A is in the non-pressable state, and the key modules 11 at the positions B, C and D are in the pressable state. That is, in the key module 11 at the position A, the stopper 113 is installed between the keycap 112 and the elastic element 111. Consequently, the keycap 112 of the key module 11 at the position A is stopped by the stopper 113 and unable to be moved toward the switch 110 in response to the external force. In the key module 11 at each of the positions B, C and D, the stopper 113 is not installed in the key module 11, or the stopper 113 is removed from the key module 11. Consequently, the key module 11 at each of the positions B, C and D is in the pressable state.

Figure 6B:
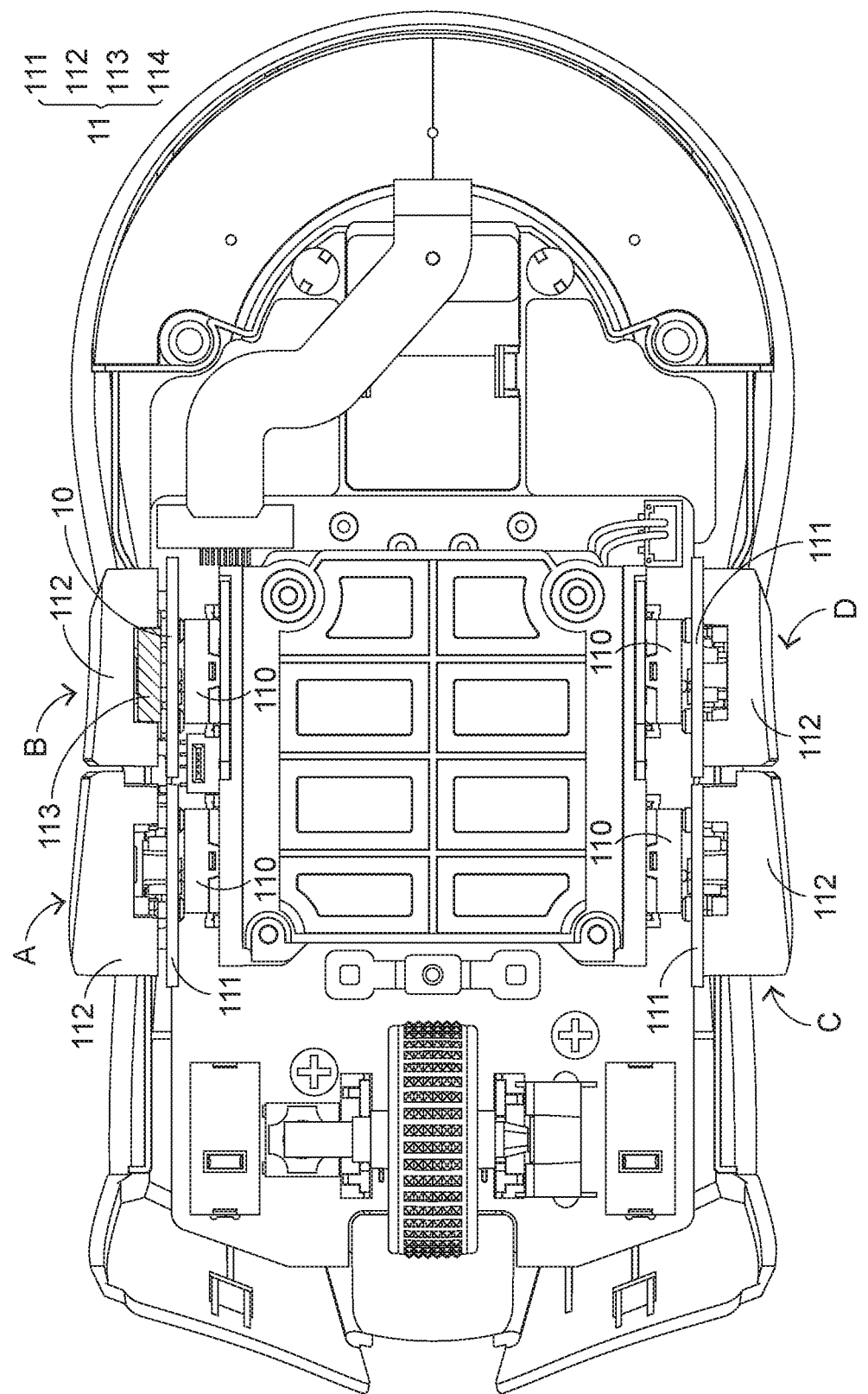

Please refer to FIG. 6B. The key module 11 at the position B is in the non-pressable state, and the key modules 11 at the positions A, C and D are in the pressable state. That is, in the key module 11 at the position B, the stopper 113 is installed between the keycap 112 and the elastic element 111. Consequently, the keycap 112 of the key module 11 at the position B is stopped by the stopper 113 and unable to be moved toward the switch 110 in response to the external force. In the key module 11 at each of the positions A, C and D, the stopper 113 is not installed in the key module 11, or the stopper 113 is removed from the key module 11. Consequently, the key module 11 at each of the positions A, C and D is in the pressable state.

Figure 6C:
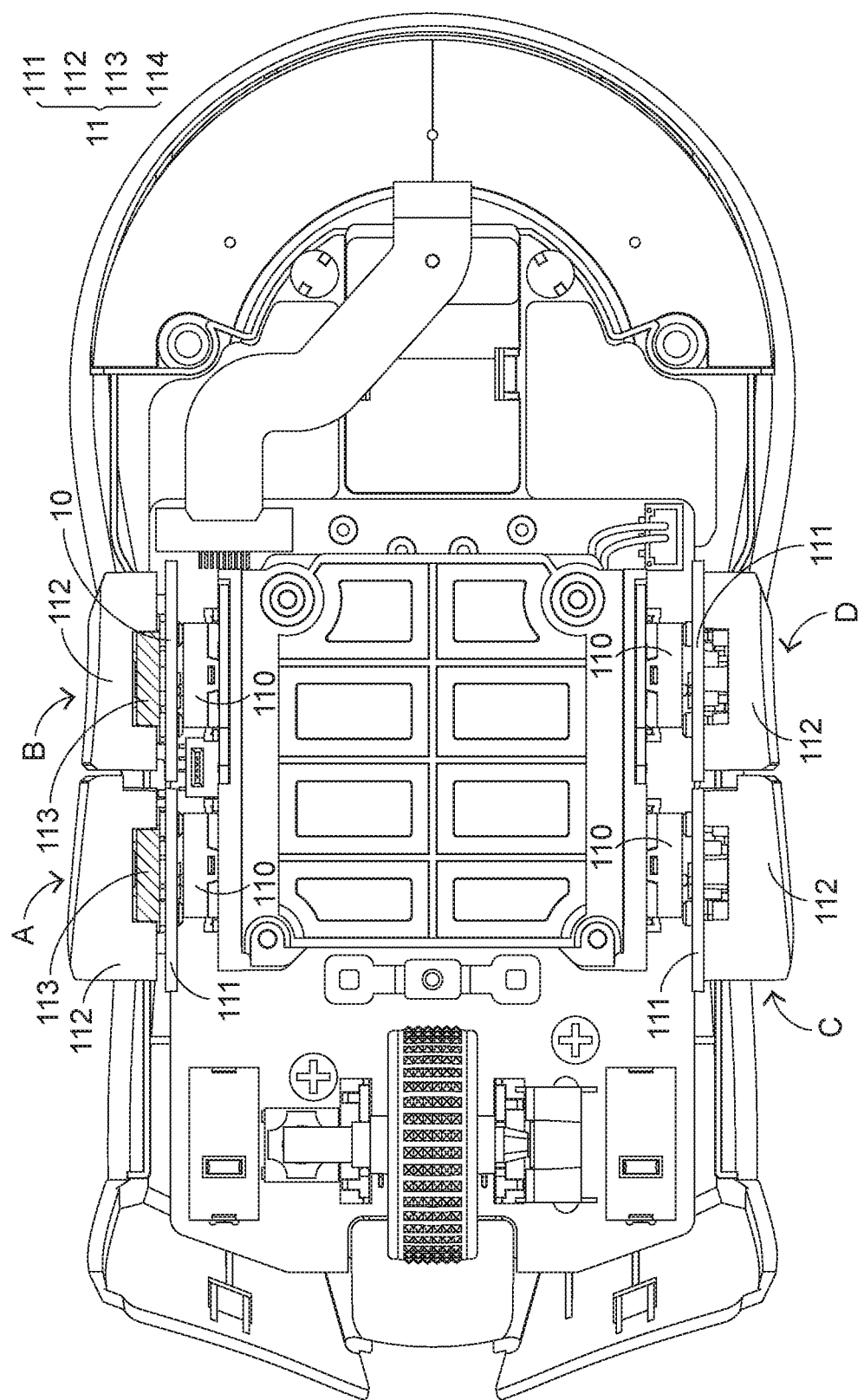

Please refer to FIG. 6C. The key module 11 at the positions A and B are in the non-pressable state, and the key modules 11 at the positions C and D are in the pressable state. That is, in the key module 11 at each of the positions A and B, the stopper 113 is installed between the keycap 112 and the elastic element 111. Consequently, the keycap 112 of the key module 11 at the each of the positions A and B is stopped by the stopper 113 and unable to be moved toward the switch 110 in response to the external force. In the key module 11 at each of the positions C and D, the stopper 113 is not installed in the key module 11, or the stopper 113 is removed from the key module 11. Consequently, the key module 11 at each of the positions C and D is in the pressable state.

In the use scenarios of FIGS. 6A, 6B and 6C, one or both of the key modules 11 at the right side of the casing 10 are in the non-pressable state. The mouse device 1 in these use scenarios is suitably used by the right-handed users.

Please refer to FIG. 6D. The key module 11 at the position C is in the non-pressable state, and the key modules 11 at the positions A, B and D are in the pressable state. That is, in the key module 11 at the position C, the stopper 113 is installed between the keycap 112 and the elastic element 111. Consequently, the keycap 112 of the key module 11 at the position A is stopped by the stopper 113 and unable to be moved toward the switch 110 in response to the external force. In the key module 11 at each of the positions A, B and D, the stopper 113 is not installed in the key module 11, or the stopper 113 is removed from the key module 11. Consequently, the key module 11 at each of the positions A, B and D is in the pressable state.

Please refer to FIG. 6E. The key module 11 at the position D is in the non-pressable state, and the key modules 11 at the positions A, B and C are in the pressable state. That is, in the key module 11 at the position D, the stopper 113 is installed between the keycap 112 and the elastic element 111. Consequently, the keycap 112 of the key module 11 at the position D is stopped by the stopper 113 and unable to be moved toward the switch 110 in response to the external force. In the key module 11 at each of the positions A, B and C, the stopper 113 is not installed in the key module 11, or the stopper 113 is removed from the key module 11. Consequently, the key module 11 at each of the positions A, B and C is in the pressable state.

Figure 6F:
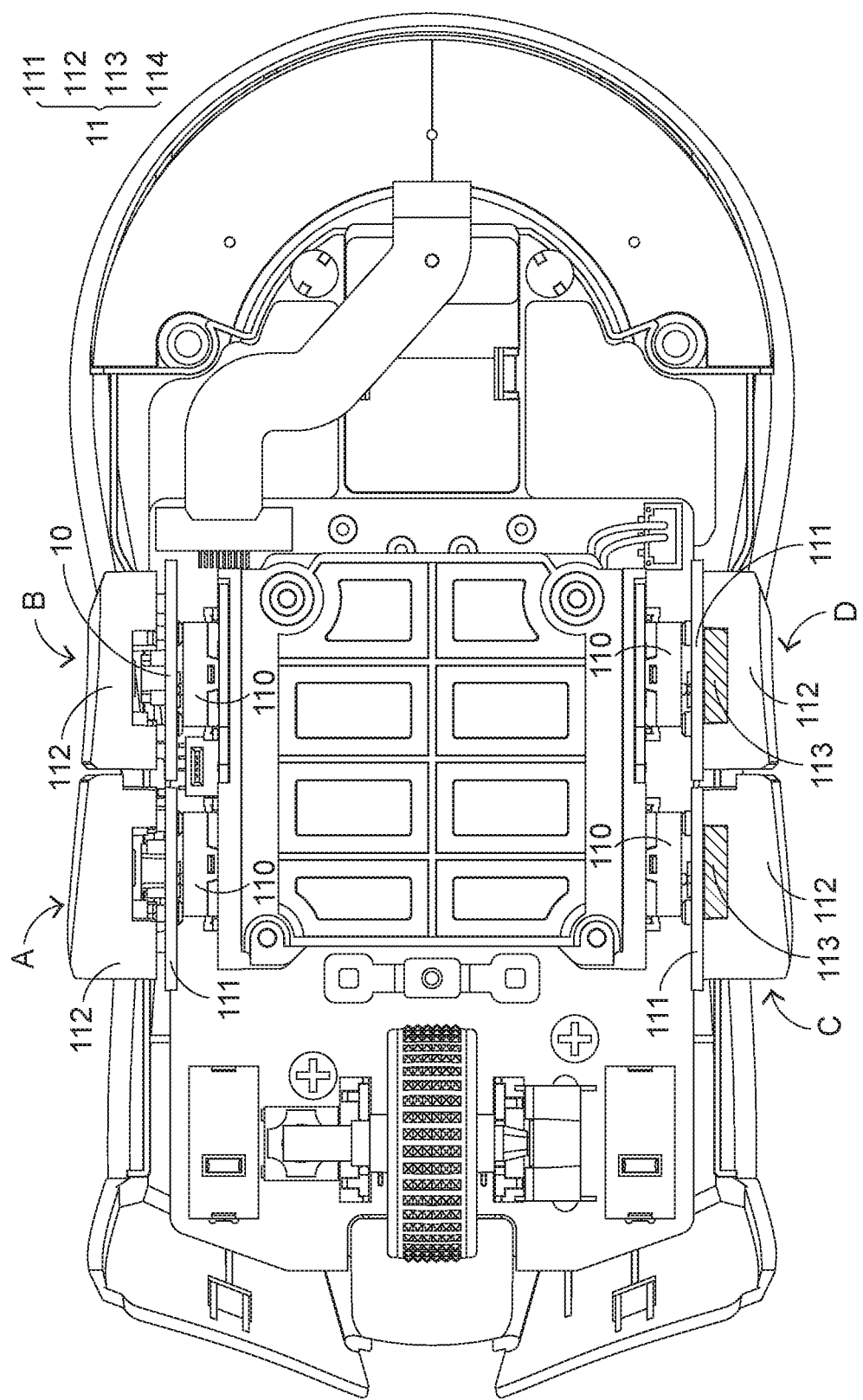

Please refer to FIG. 6F. The key module 11 at the positions C and D are in the non-pressable state, and the key modules 11 at the positions A and B are in the pressable state. That is, in the key module 11 at each of the positions C and D, the stopper 113 is installed between the keycap 112 and the elastic element 111. Consequently, the keycap 112 of the key module 11 at the each of the positions C and D is stopped by the stopper 113 and unable to be moved toward the switch 110 in response to the external force. In the key module 11 at each of the positions A and B, the stopper 113 is not installed in the key module 11, or the stopper 113 is removed from the key module 11. Consequently, the key module 11 at each of the positions A and B is in the pressable state.

In the use scenarios of FIGS. 6D, 6E and 6F, one or both of the key modules 11 at the left side of the casing 10 are in the non-pressable state. The mouse device 1 in these use scenarios is suitably used by the left-handed users.

From the above descriptions, the present invention provides the mouse device. In case that the stopper is installed between the keycap and the elastic element, the key module is switched from the pressable state to the non-pressable state. Due to this structural design, some or all of the key modules of the mouse device can be selectively switched to the non-pressable state by the user according to the use habit. During the process of using the mouse device, the user will not accidentally press the unnecessary key module. Consequently, the convenience of using the mouse device is largely enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A mouse device, comprising:
a casing; and
plural key modules installed on two opposite sides of the casing, wherein each of the plural key modules comprises:
a switch disposed within the casing;
an elastic element disposed within the casing and aligned with the switch;
a keycap detachably connected with the elastic element and exposed outside the casing, wherein the elastic element is arranged between the keycap and the switch, wherein when the keycap is in a pressable state and the keycap is pressed in response to an external force, the keycap is moved in a direction toward the switch and the elastic element is moved with the keycap, so that the switch is triggered by the elastic element; and
a stopper detachably connected between the keycap and the elastic element, wherein when the keycap is stopped by the stopper, the keycap is switched from the pressable state to a non-pressable state.

2. The mouse device according to claim 1, wherein the stopper comprises a first stopping part, and the first stopping part comprises a first sleeve and a first contact post, wherein the first sleeve is extended in a direction toward the keycap and connected with the keycap, the first contact post is connected with the first sleeve and extended in a direction toward the switch, and the first contact post is penetrated through the elastic element and contacted with the switch.

3. The mouse device according to claim 2, wherein the stopper further comprises a second stopping part and a connecting part, wherein the connecting part is connected between the first stopping part and the second stopping part, and the second stopping part comprises a second sleeve and a second contact post, wherein the second sleeve is extended in a direction toward the keycap and connected with the keycap, the second contact post is connected with the second sleeve and extended in a direction toward the switch, and the second contact post is penetrated through the elastic element and contacted with the switch.

4. The mouse device according to claim 3, wherein the keycap comprises a first connecting post and a second connecting post, wherein the first connecting post and the second connecting post are extended in a direction toward the elastic element, the first connecting post is inserted in the first sleeve of the first stopping part, and the second connecting post is inserted in the second sleeve of the second stopping part.

5. The mouse device according to claim 4, wherein each of the first sleeve and the second sleeve has a contact surface, wherein when the first connecting post is inserted in the first sleeve, the first connecting post is contacted with the contact surface of the first sleeve, wherein when the second connecting post is inserted in the second sleeve, the second connecting post is contacted with the contact surface of the second sleeve.

6. The mouse device according to claim 3, wherein the elastic element comprises a first opening and a second opening, wherein the first contact post of the stoppering is penetrated through the first opening and contacted with a first side of the switch, and the second contact post of the stopper is penetrated through the second opening and contacted with a second side of the switch.

7. The mouse device according to claim 6, wherein the elastic element further comprises a triggering part and a bracket part, wherein the bracket part is connected between the triggering part and the casing, and the first opening and the second opening are respectively located at two opposite sides of the triggering part, wherein when the keycap is in the pressable state and the keycap is pressed in response to the external force, the keycap is moved toward the switch and the triggering part of the elastic element is moved with the keycap, so that the switch is triggered by the triggering part of the elastic element.

8. The mouse device according to claim 1, wherein each of the plural key modules further comprises a first magnet and a second magnet, wherein the first magnet is installed on the keycap, and the second magnet is installed on the elastic element, wherein the keycap and the elastic element are detachably connected with each other in response to a magnetic attraction force between the first magnet and the second magnet.

9. The mouse device according to claim 1, wherein after the stopper is removed from a region between the keycap and the elastic element, the keycap is switched from the non-pressable state to the pressable state.

10. The mouse device according to claim 1, wherein the mouse device further comprises a key plate, wherein the key plate covers a top side of the casing, and the key plate is arranged between the plural key modules, wherein when each of the plural key modules is pressed down, the mouse device issues a first key signal, wherein when the key plate is pressed down, the mouse device issues a second key signal, wherein the second key signal is different from the first key signal.

* * * * *